US010409435B2

(12) United States Patent
Wada et al.

(10) Patent No.: US 10,409,435 B2
(45) Date of Patent: Sep. 10, 2019

(54) INPUT DEVICE WITH ONE DIRECTIONAL LEAD WIRING

(71) Applicant: Alps Alpine Co., Ltd., Tokyo (JP)

(72) Inventors: Suguru Wada, Niigata-ken (JP); Junji Hashida, Niigata-ken (JP); Toru Sawada, Niigata-ken (JP); Atsushi Matsuda, Niigata-ken (JP); Toru Takahashi, Niigata-ken (JP); Minoru Sato, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 15/782,691

(22) Filed: Oct. 12, 2017

(65) Prior Publication Data

US 2018/0046287 A1  Feb. 15, 2018

Related U.S. Application Data

(63) Continuation of application No. PCT/JP2016/064427, filed on May 16, 2016.

(30) Foreign Application Priority Data

Jun. 26, 2015  (JP) .................................. 2015-128798

(51) Int. Cl.
*G06F 3/045* (2006.01)
*G06F 3/047* (2006.01)
(Continued)

(52) U.S. Cl.
CPC ................ *G06F 3/047* (2013.01); *B32B 7/02* (2013.01); *B32B 7/12* (2013.01); *B32B 9/00* (2013.01);
(Continued)

(58) Field of Classification Search
CPC .. G06F 3/047; B32B 7/02; B32B 7/12; B32B 9/00
(Continued)

(56) References Cited

U.S. PATENT DOCUMENTS

2008/0136989 A1* 6/2008 Higaki .................... H01L 27/12
349/46
2011/0207328 A1* 8/2011 Speakman .......... H01L 51/0011
438/694
(Continued)

FOREIGN PATENT DOCUMENTS

JP 2000-323805 11/2000
JP 2005-183007 7/2005
(Continued)

OTHER PUBLICATIONS

International Search Report from International Application No. PCT/JP2016/064427 dated Jun. 21, 2016.

*Primary Examiner* — Jonathan M Blancha
(74) *Attorney, Agent, or Firm* — Beyer Law Group LLP (57) ABSTRACT

An input device that enables wires to be bent together with a base material without deteriorating translucency and conductivity of the wires has: a base material having translucency and flexibility; first electrode parts and second electrode parts, both having translucency, that are provided in a sensing region on the base material; and lead wires that are electrically continuous to the first electrode parts and second electrode parts, the lead wires extending, on the base material, from the sensing region to a peripheral region. A bent portion is provided in the peripheral region on the base material. Each lead wire has a flexible laminated body provided on the bent portion. The flexible laminated body has a first amorphous ITO layer provided on the base material, a conductive layer provided on the first amorphous
(Continued)

ITO layer, and a second amorphous ITO layer provided on the conductive layer.

22 Claims, 5 Drawing Sheets

(51) Int. Cl.
| | | |
|---|---|---|
| B32B 7/02 | (2019.01) | |
| B32B 9/00 | (2006.01) | |
| G06F 3/041 | (2006.01) | |
| B32B 7/12 | (2006.01) | |
| B32B 27/08 | (2006.01) | |
| B32B 27/36 | (2006.01) | |

(52) U.S. Cl.
CPC ............ B32B 27/08 (2013.01); B32B 27/365 (2013.01); G06F 3/041 (2013.01); G06F 3/0416 (2013.01); G06F 2203/04102 (2013.01)

(58) Field of Classification Search
USPC .......................................................... 345/174
See application file for complete search history.

(56) References Cited

U.S. PATENT DOCUMENTS

| | | | | |
|---|---|---|---|---|
| 2014/0139447 | A1* | 5/2014 | Kang | G06F 3/044 345/173 |
| 2014/0170413 | A1* | 6/2014 | Hassan | C23C 28/42 428/336 |
| 2014/0267953 | A1* | 9/2014 | Kim | G06F 3/044 349/12 |
| 2015/0070312 | A1 | 3/2015 | Her et al. | |
| 2015/0212548 | A1 | 7/2015 | Namkung et al. | |
| 2015/0241906 | A1* | 8/2015 | Tsai | G06F 3/044 345/173 |
| 2016/0172428 | A1* | 6/2016 | Song | H01L 27/3276 257/99 |

FOREIGN PATENT DOCUMENTS

| | | |
|---|---|---|
| JP | 2013-178738 | 9/2013 |
| JP | 2013-186633 | 9/2013 |
| JP | 2015-15012 | 1/2015 |

* cited by examiner

INPUT DEVICE WITH ONE DIRECTIONAL LEAD WIRING

CLAIM OF PRIORITY

This application is a Continuation of International Application No. PCT/JP2016/064427 filed on May 16, 2016, which claims benefit of Japanese Patent Application No. 2015-128798 filed on Jun. 26, 2015. The entire contents of each application noted above are hereby incorporated by reference.

BACKGROUND OF THE INVENTION

1. Field of the Invention

The present invention relates to an input device in which a plurality of electrode parts for use for detection are provided on a base material having translucency and flexibility.

2. Description of the Related Art

Many touch panels that sense a capacitance are used as input devices used as part of mobile terminals and other various types of electronic devices. Japanese Unexamined Patent Application Publication No. 2013-186633 describes a transparent conductive film in which, to achieve a narrowed frame and reduced thickness, a lower-layer wiring part and an upper-layer wiring part are provided and a transparent circuit board is bent.

U.S. Patent Application Publication No. 2015/0070312 describes a touch window that includes a circuit board having a first sensing region and a second sensing region, a first sensing electrode provided on the first sensing region, the first sensing electrode detecting a position, and a second sensing electrode provided on the second sensing region, the second sensing electrode detecting a position. In this touch window, the material of the first sensing electrode differs from the material of the second sensing electrode. A structure in which the second sensing electrode is bent from the first sensing electrode is also described.

SUMMARY OF THE INVENTION

However, when an indium tin oxide (ITO) material and a metal, which are used as a translucent electrode or lead wire, are bent, they are likely to cause a crack or conduction failure, so there is the problem that it is difficult to use them at bent portions. Therefore, to provide a wire a bent portion on a base material, the wire needs to be formed by using an easy-to-bend material (such as, for example, a conductive polymer (poly(3,4-ethylenedioxythiophene)/poly(styrenesulfonate)(PEDOT/PSS) or the like) or a metal nanowire). However, if an easy-to-use material like this is used, a problem arises in that translucency and conductivity are lowered and wires are not easily thinned.

The present invention provides an input device that enables wires to be bent together with a base material without deteriorating the translucency and conductivity of the wires.

To solve the above problem, the input device in the present invention has a base material having translucency and flexibility, a plurality of first electrode parts having translucency, the plurality of first electrode parts being arranged in a sensing region on the base material in a first direction, a plurality of second electrode parts having translucency, the plurality of second electrode parts being arranged in the sensing region on the base material in a second direction crossing the first direction, and a plurality of lead wires that are electrically continuous to the plurality of first electrode parts and the plurality of second electrode parts, the plurality of lead wires extending, on the base material, from the sensing region to a peripheral region allocated outside the sensing region. A bent portion is provided in the peripheral region on the base material. Each lead wire has a flexible laminated body provided on the bent portion. The flexible laminated body has a first amorphous ITO layer provided on the base material, a conductive layer provided on the first amorphous ITO layer, and a second amorphous ITO layer provided on the conductive layer.

According to this type of structure, since a laminated structure having the first amorphous ITO layer, conductive layer, and second amorphous ITO layer is used as the flexible laminated body provided on the bent portion on the base material, even if the base material is bent, not only translucency but also adequate electrical characteristics can be maintained.

In the input device in the present invention, the lead wire may have a first wire part provided closer to the sensing region than the bent portion is, and may also have a second wire part provided more far from the sensing region than the bent portion is. The flexible laminated body may be positioned between the first wire part and the second wire part. Accordingly, the material from which the first wire part and second wire part are formed does not need to be ease-to-bend, so flexibility in design can be increased.

In the input device in the present invention, the first wire part and second wire part each preferably have a connecting part connected to an end of the flexible laminated body, and a surface of the connecting part, the surface facing the flexible laminated body, preferably has a crystallized ITO surface. Accordingly, it is not only possible to realize high translucency and low specific resistance for the lead wire, but also possible to increase tight adhesion between the flexible laminated body and the connecting part.

In the input device in the present invention, the first wire part may include a crystallized ITO layer. The second wire part may include a crystallized ITO layer. Accordingly, the translucency and conductivity of the first wire part and second wire part are increased.

In the input device in the present invention, the first amorphous ITO layer may be in contact with the base material. Accordingly, the resistance of the flexible laminated body to bending can be more stably improved. In the input device in the present invention, the conductive layer may include a noble metal. Accordingly, the electric resistance of the flexible laminated body can be reduced.

In the input device in the present invention, even if the radius of curvature of the bent portion is 5 millimeters (mm) or less, it is possible to obtain adequate electrical characteristics.

The input device in the present invention may further have a linking part that links the plurality of first electrode parts as well as a bridge connecting part provided between the plurality of second electrode parts, the bridge connecting part crossing the linking part with an insulating layer interposed therebetween. The bridge connecting part may be formed from the same material as the flexible laminated body. Accordingly, the flexible laminated body can be formed in the process in which the bridge connecting part is formed.

According to the present invention, it becomes possible to provide an input device that enables wires to be bent together with a base material without deteriorating translucency and conductivity of the wires.

DESCRIPTION OF THE PREFERRED EMBODIMENT

An embodiment of the present invention will be described with reference to the drawings. In the description below, like members will be assigned like reference characters. For members that have been described once, their description will be appropriately omitted.

Electronic Device to which Input Device is Applied

Figure 1:
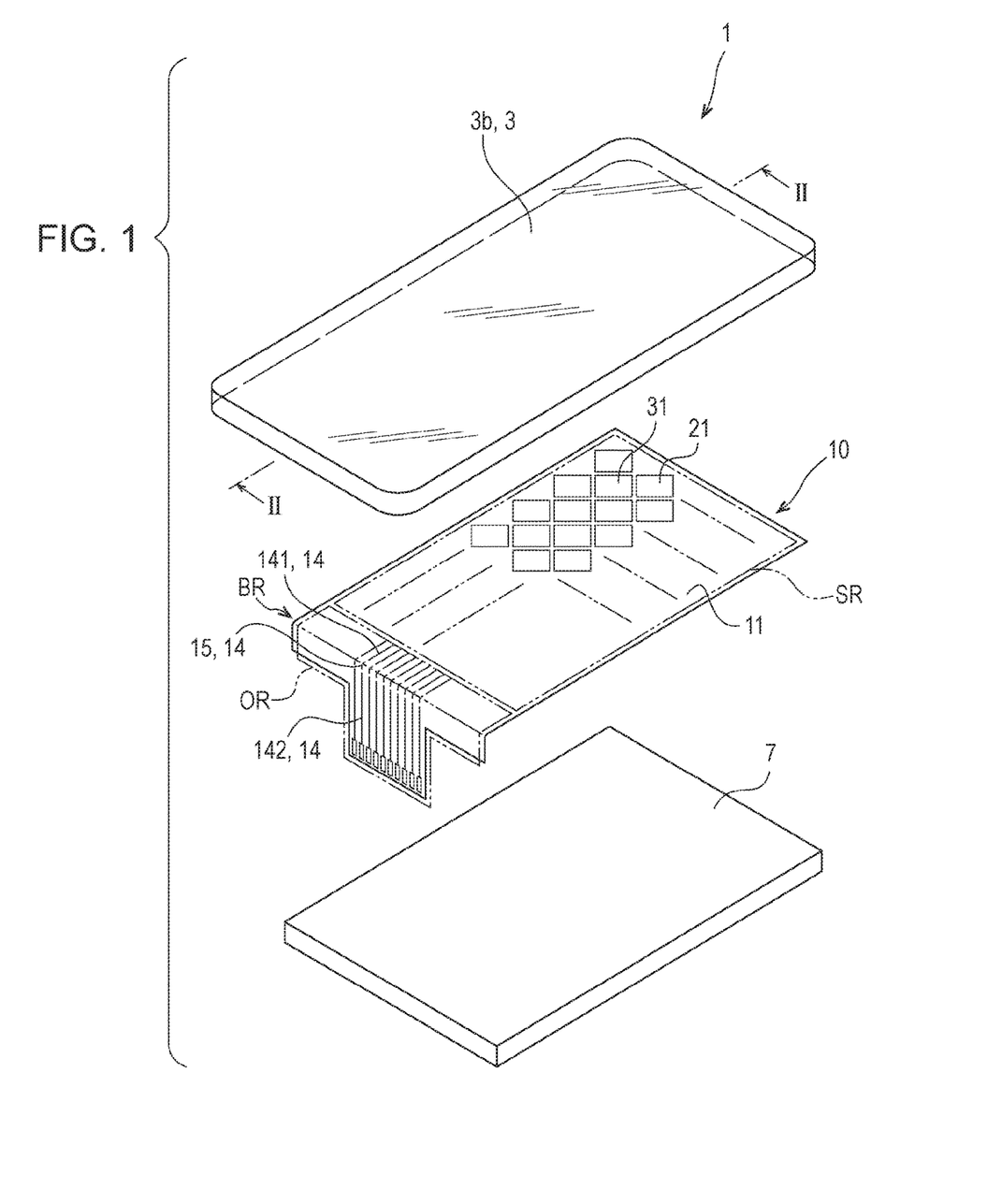
FIG. 1 is an exploded perspective view illustrating an electronic device to which an input device according to this embodiment is applied.
Figure 2:
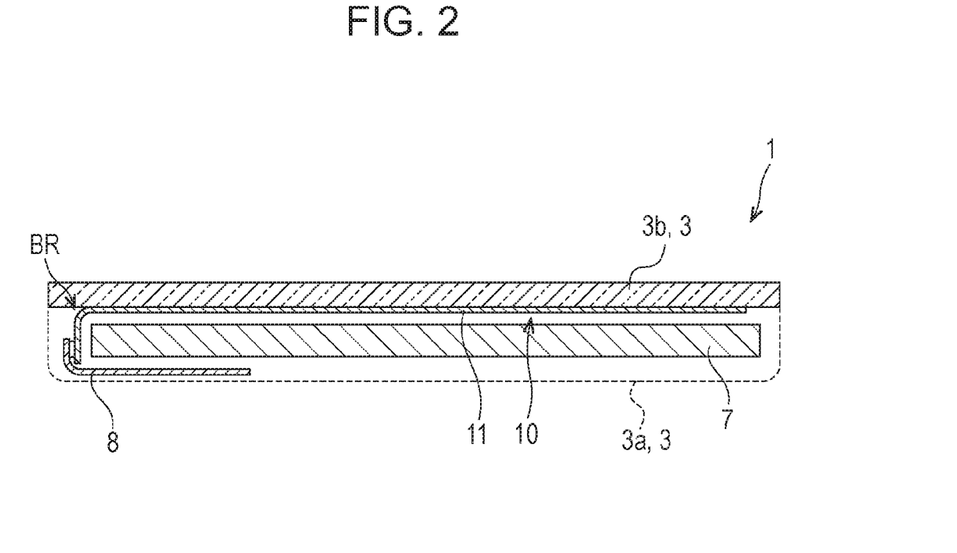
FIG. 2 is a cross-sectional view taken along line II-II in FIG. 1.

FIG. 1 is an exploded perspective view illustrating an electronic device to which an input device according to this embodiment is applied. FIG. 2 is a cross-sectional view taken along line II-II in FIG. 1.

As illustrated in FIGS. 1 and 2, the electronic device 1 has a case 3. The case 3 is formed by a combination of a main body case section 3a and a panel section 3b. For convenience of description, the main body case section 3a is indicated only in FIG. 2 by dashed lines. The main body case section 3a is formed from, for example, a synthetic resin material. The main body case section 3a has a box-like shape, the top of which is open. The panel section 3b is placed so as to cover the opening of the main body case section 3a.

The panel section 3b is formed from a translucent resin material such as a glass, a polycarbonate resin, or an acrylic resin. In this description, "translucency" and "transparent" means a state in which the transmittance of visible light is 50% or more (preferably 80% or more).

A base material 11 having translucency and flexibility is placed inside the panel section 3b. A wiring board 8 joined to an end of the base material 11 is accommodated in the case 3. The wiring board 8 is, for example, a flexible wiring board. A display panel 7 such as a liquid crystal display panel or electroluminescent display panel is also accommodated in the case 3. An image displayed on the display panel 7 is transmitted through the base material 11 and panel section 3b, so the image is visible from the outside.

Part of the base material 11 is bonded to the inner surface of the panel section 3b with, for example, an optically clear adhesive (OCA), which is an adhesive with high transparency. The base material 11 is formed from a resin film having translucency such as polyethylene terephthalate (PET) film having flexibility or a polycarbonate (PC) film. The base material 11 may include an optical adjustment layer (silicon dioxide ($SiO_2$) or the like) or hard coat layer provided on the surface of the PET file or the like. A plurality of first electrode parts 21 and a plurality of second electrode parts 31 are formed on the surface of the base material 11.

The plurality of first electrode parts 21 are orderly arranged in a sensing region SR on the base material 11 in a first direction. The plurality of second electrode parts 31 are also orderly arranged in the sensing region SR on the base material 11 in a second direction crossing the first direction. With the electronic device 1 according to this embodiment, the first direction and second direction are mutually orthogonal, as illustrated in FIG. 1. On the base material 11, a plurality of lead wires 14 that are electrically continuous to these first electrode parts 21 and second electrode parts 31 are provided. Each lead wire 14 extends from the sensing region SR on the base material 11 to a circumferential region OR allocated outside the sensing region SR. An input device 10, which is of a capacitance type, includes the base material 11, first electrode parts 21, second electrode parts 31, and lead wires 14. The first electrode parts 21, second electrode parts 31, and lead wires 14 will be described later in detail.

In this embodiment, a bent portion BR is provided in the circumferential region OR on the base material 11. The base material 11 is bent through, for example, about 90 degrees at the bent portion BR. The lead wire 14 preferably has a first wire part 141 provided closer to the sensing region SR than the bent portion BR is, a second wire part 142 provided more far from the sensing region SR than the bent portion BR is, and a flexible laminated body 15, which is preferably positioned between the first wire part 141 and the second wire part 142 and disposed on the bent portion BR.

Figure 3A:
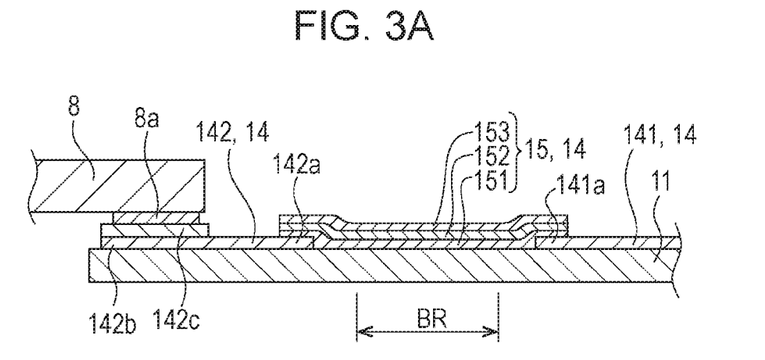
FIGS. 3A and 3B are schematic cross-sectional views illustrating a flexible laminated body.
Figure 3B:
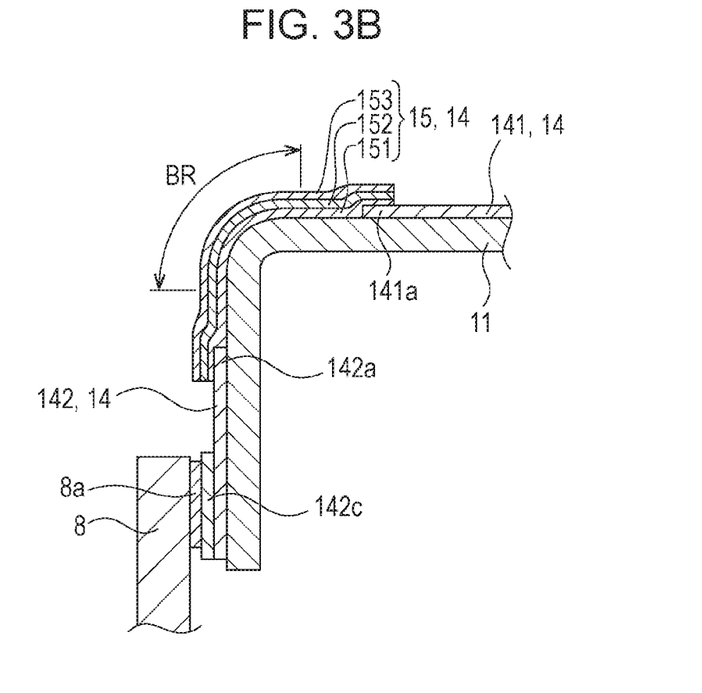

FIGS. 3A and 3B are schematic cross-sectional views illustrating the flexible laminated body 15. FIG. 3A illustrates a state in which the base material 11 is not bent, and FIG. 3B illustrates a state in which the base material 11 is bent.

The flexible laminated body 15 provided on the bent portion BR has a first amorphous ITO layer 151 provided on the base material 11, a conductive layer 152 provided on the first amorphous ITO layer 151, and a second amorphous ITO layer 153 provided on the conductive layer 152.

The first amorphous ITO layer 151 preferably has a portion in contact with the base material 11. Thus, the resistance of the flexible laminated body 15 to the bending can be more stably improved. A conductive material having specific resistance lower than that of the first amorphous ITO layer 151 is used for the conductive layer 152. For example, a noble metal such as Au, Ag, Cu, Pt, or Pd, Ni, or an alloy including at least any of them (a specific example is a CuNi alloy) is used for the conductive layer 152. In this embodiment, Au is used as the material of the conductive layer 152. The conductive layer 152 may have a laminated structure.

The second amorphous ITO layer 153 is provided on the conductive layer 152 to serve to suppress the conductive layer 152 from being visually recognized from the outside. A connecting part 141a is preferably provided at an end of the first wire part 141, and a connecting part 142a is preferably provided at an end of the second wire part 142. Both ends of the flexible laminated body 15 are preferably connected to these connecting parts 141a and 142a. A metal layer 142c is provided at an end 142b of the second wire part 142, the end 142b being opposite to the connecting part 142a of the second wire part 142. This metal layer 142c forms part of a terminal part connected to a metal terminal 8a provided on the wiring board 8.

The surfaces, facing the flexible laminated body 15, of the connecting parts 141a and 142a preferably have a crystallized ITO surface. More preferably, these surfaces are a crystallized ITO surface. This enables the first amorphous ITO layer 151 of the flexible laminated body 15 to more tightly adhere (more strongly connects) to the connection parts 141a and 142a.

The first wire part 141 of the lead wire 14 may include a crystallized ITO layer. The second wire part 142 of the lead wire 14 may also include a crystallized ITO layer. Accordingly, it is possible to improve the translucency of the first wire part 141 and second wire part 142 and to reduce their resistances, and also possible to form the connecting parts 141a and 142a, which are composed of a crystallized ITO layer, in the process in which the first wire part 141 and second wire part 142 are formed.

As a specific example, the first wire part 141 is formed from a crystallized ITO material. As for the second wire part 142, the same side as the connecting part 142a is formed from a crystallized ITO material, and the same side as the end 142b opposite to the connection part 142a is formed by forming a crystallized ITO layer and also forming the metal layer 142c (a laminated structure including CuNi, Cu, and CuNi in that order, for example) on the crystallized ITO layer.

When a laminated structure including the first amorphous ITO layer 151, conductive layer 152, and second amorphous ITO layer 153 is formed as the flexible laminated body 15, it is possible to achieve both transparency and flexibility due to amorphous ITO and a reduction in resistance due to the conductive layer 152. For example, even if the radius of curvature of the bent portion BR of the base material 11 is 5 mm or less, the base material 11 can have adequate resistance to mechanical fracture and electric disconnection. That is, when the flexible laminated body 15 is provided at the bent portion BR, it is possible to bend the base material 11 in a state in which its translucency and conductivity are maintained.

Electrodes and Wires

Figure 4:
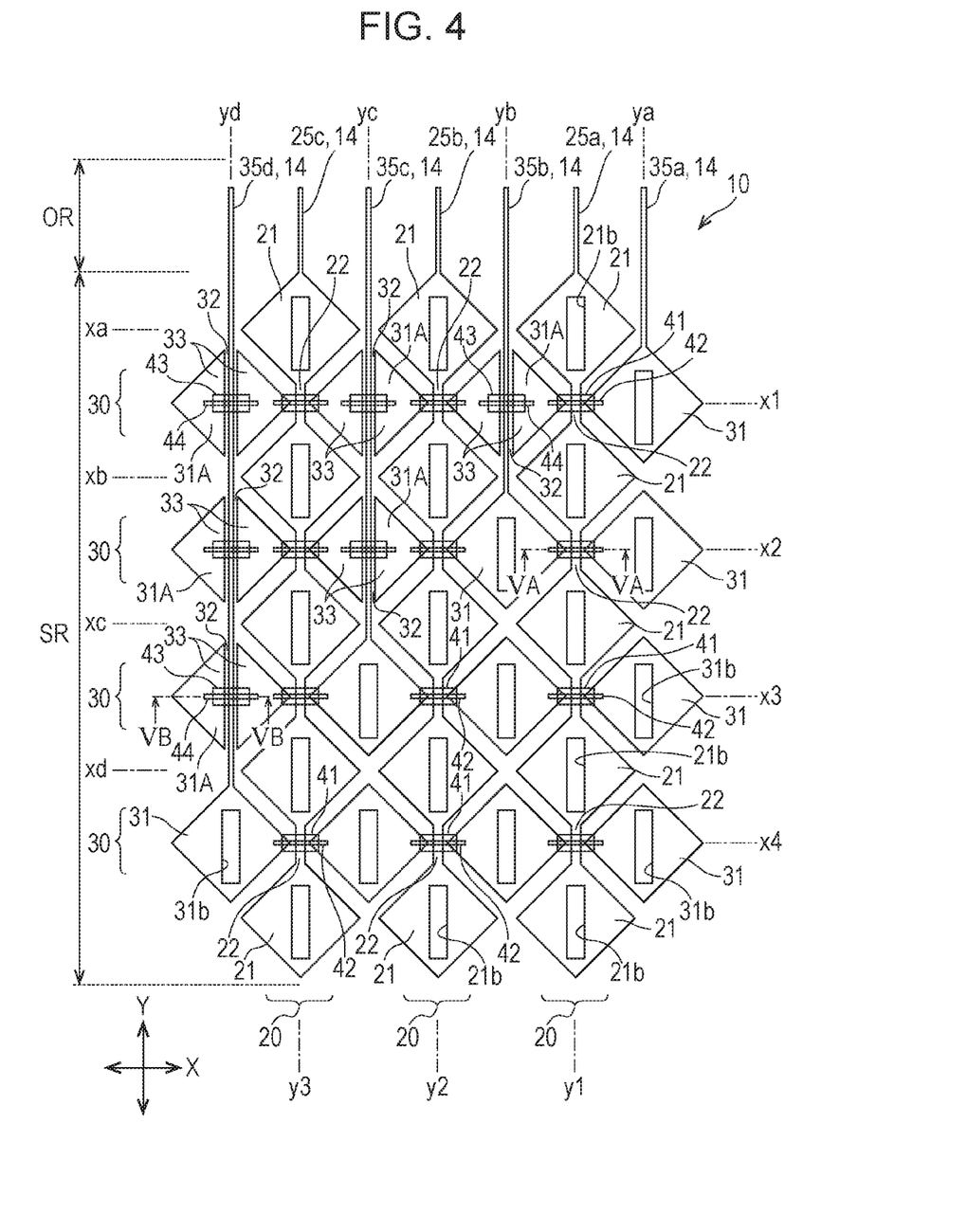
FIG. 4 is a schematic plan view illustrating the placement of electrodes.
Figure 5A:
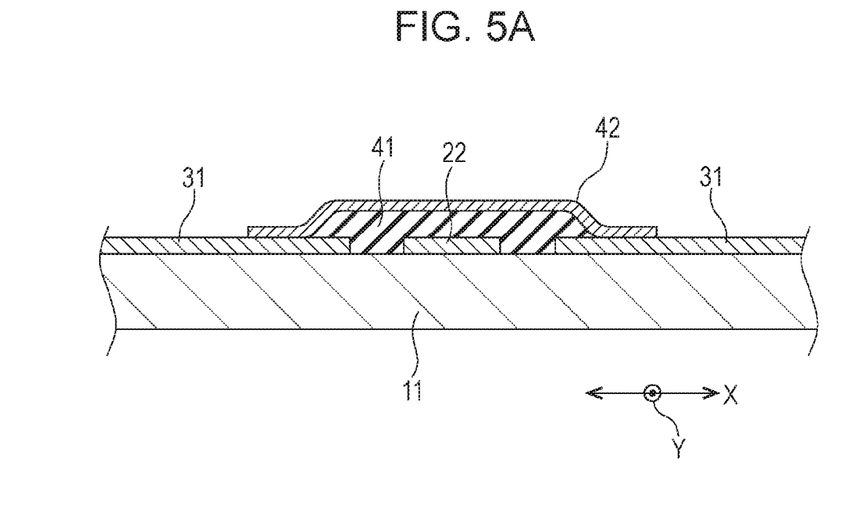
FIGS. 5A and 5B are schematic cross-sectional views of a bridge wire part.
Figure 5B:
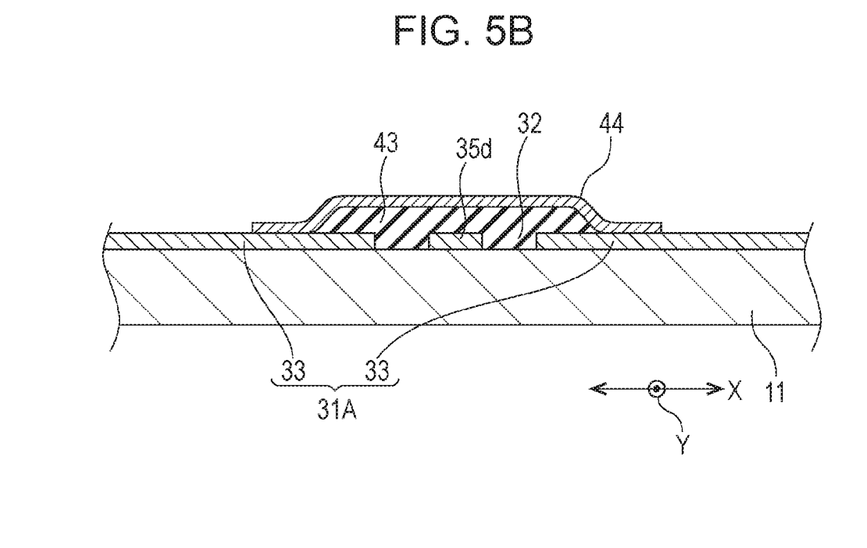

Next, the first electrode part 21, second electrode part 31, and lead wire 14 will be described in detail. FIG. 4 is a schematic plan view illustrating the placement of electrodes. FIGS. 5A and 5B are schematic cross-sectional views of a bridge wire part.

As illustrated in FIG. 4, first electrode strings 20 extending in the first direction (Y direction) on the surface of the base material 11 and second electrode strings 30 extending in the second direction (X direction) are formed on the base material 11. In the first electrode string 20, a plurality of first electrode parts 21 and linking parts 22, which preferably link the first electrode parts 21 in the Y direction, are integrally formed. Although three columns, y1, y2 and y3, of first electrode strings 20 are provided, the number of columns is selected according to the area of the input device 10.

The first electrode part 21 is in a substantially square shape (or substantially rhombus shape), and the corners of the substantially square shape are oriented in the X direction and Y direction. Each linking part 22 links the Y-direction corners of two first electrode parts 21 adjacent in the Y direction.

Second electrode strings 30 are orderly placed at equal pitches along four rows, x1, x2, x3 and x4, in the X direction, and second electrode parts 31 included in the second electrode strings 30 are also orderly placed along columns ya, yb, yc, and yd in the Y direction. The number of rows in the X direction and the number of columns in the Y direction are selected according to the area of the input device 10. The second electrode part 31 is in a substantially square shape (or substantially rhombus shape), and the corners of the second electrode part 31 are oriented in the X direction and Y direction. There is a match between the size of each side of the quadrangle of the first electrode part 21 and the size of each side of the quadrangle of the second electrode part 31.

Some second electrode parts 31 have a wire path 32 at their centers. To distinguish from the second electrode part 31 that lacks the wire path 32, the second electrode parts having the wire path 32 will be denoted 31A.

In the second electrode part 31A, the wire path 32 linearly extends in the Y direction. The wire path 32 is formed at the center of the second electrode part 31A in the X direction so that the second electrode part 31A is equally divided in the X direction. The second electrode part 31A is divided into two segmented electrode layers 33 by the wire path 32.

The first electrode part 21, linking part 22, and second electrode parts 31 and 31A are formed from the same conductive material having translucency. The conductive material having translucency is an ITO material, a metal nanowire typified by a silver nanowire, a thin metal formed like a mesh, a conductive polymer, or the like.

FIG. 5A illustrates a cross-sectional view (taken along line VA-VA) of the laminated structure at an intersection between the first electrode string 20 in column y1 and the second electrode string 30 in row x2 in FIG. 4. At this intersection, a first insulating layer 41 having translucency is formed, the first insulating layer 41 covering the linking part 22 of the first electrode string 20. A first bridge connecting layer 42 is preferably formed on the first insulating layer 41. Second electrode parts 31 adjacent to both ends of the linking part 22 in the X direction are mutually connected by the first bridge connecting layer 42 and become electrically continuous to each other.

The first insulating layer 41 and first bridge connecting layer 42 are formed at all intersections between the first electrode strings 20 and the second electrode strings 30. The second electrode parts 31 and 31A arranged in row x1 are linked in the X direction. In rows x2, x3, and x4, the second electrode parts 31 and 31A are similarly linked in the X direction.

The first insulating layer 41 having translucency is formed from a novolak resin or a combination of a novolak resin and an acrylic resin. The first bridge connecting layer 42 preferably has the same layer structure as the flexible laminated body 15. That is, the first bridge connecting layer 42 has a laminated structure including the first amorphous ITO layer 151, conductive layer 152, and second amorphous ITO layer 153.

When the first electrode part 21, linking part 22, and second electrode part 31 are each formed as an ITO layer, if they are made of a crystallized ITO material, it becomes possible to selectively etch the crystallized ITO layers forming the first electrode part 21, linking part 22 and second electrode part 31 and the material forming the first insulating layer 41. The surfaces, facing the flexible laminated body 15, of the connection part 141a of the first wire part 141 and the connection part 142a of the second wire part 142, the connection part 141a and 142a being connected to the flexible laminated body 15, are preferably a crystallized ITO surface. Therefore, if the first electrode part 21, linking part 22, and second electrode part 31 are made of a crystallized ITO material, it becomes possible to integrally form the first electrode part 21, the linking part 22, the second electrode part 31, and portions including the connection part 141a of the first wire part 141 and the connection part 142a of the second wire part 142 from a crystallized ITO material.

At an intersection between the first electrode string 20 and the second electrode string 30, a linking part that mutually links second electrode parts 31 and 31A adjacent in the X direction may be formed integrally with the second electrode parts 31 and 31A, and a plurality of second electrode parts 31 and 31A may be continuously formed in the X direction. In this case, first electrode parts 21, which are mutually independent, are placed at both ends of the relevant second electrode part 31 or 31A in the Y direction with the linking part interposed therebetween, the first insulating layer 41 and first bridge connecting layer 42 are formed on the linking part linking the second electrode parts 31 and 31A together, and first electrode parts 21 adjacent in the Y direction are connected by the first bridge connecting layer 42.

As illustrated in FIG. 4, the circumferential region OR formed at an end of the base material 11 in the Y direction includes a first wiring layer 25a formed integrally with the first electrode part 21 in column y1, a first wiring layer 25b formed integrally with the first electrode part 21 in columns y2, and a first wiring layer 25c formed integrally with the first electrode part 21 in columns y3. The circumferential region OR also includes second wiring layers 35a, 35b, 35c, and 35d, which are electrically continuous to second electrode strings 30. The first wiring layers 25a, 25b and 25c and the second wiring layers 35a, 35b, 35c and 35d are each the lead wire 14.

The first wiring layers 25a, 25b and 25c and the second wiring layers 35a, 35b, 35c and 35d are routed in the circumferential region OR and are electrically continuous to the metal layers 142c of the relevant second wire parts 142 provided in the circumferential region OR.

As illustrated in FIG. 4, the second wiring layer 35a is formed integrally with the second electrode part 31 positioned at the intersection between row x1 and column ya, and the second wiring layer 35b is formed integrally with the second electrode part 31 positioned at the intersection between row x2 and column yb. This second wiring layer 35b passes through the interior of the wire path 32 formed in the second electrode part 31A positioned at the intersection between row x1 and column yb, and linearly extends in the Y direction to the circumferential region OR.

The second wiring layer 35c is formed integrally with the second electrode part 31 positioned at the intersection between row x3 and column yc. This second wiring layer 35c passes through the interior of the wire path 32 formed in the second electrode part 31A positioned at the intersection between row x2 and column yc and the interior of the wire path 32 formed in the second electrode part 31A positioned at the intersection between row x1 and column yc, and linearly extends in the Y direction to the circumferential region OR.

The second wiring layer 35d is formed integrally with the second electrode part 31 positioned at the intersection between row x4 and column yd. This second wiring layer 35d passes through the interior of the wire path 32 formed in the second electrode part 31A positioned at the intersection between row x3 and column yd, the interior of the wire path 32 formed in the second electrode part 31A positioned at the intersection between row x2 and column yd, and the interior of the wire path 32 formed in the second electrode part 31A positioned at the intersection between row x1 and column yd, and linearly extends in the Y direction to the circumferential region OR.

The second wiring layer 35a is electrically continuous to the second electrode parts 31 and 31A constituting the second electrode string 30 positioned in row x1. Similarly, the second wiring layers 35b, 35c and 35d are electrically continuous to the second electrode parts 31 and 31A constituting the second electrode strings 30 positioned in rows x2, x3 and x4, respectively. The second wiring layers 35a, 35b, 35c, and 35d are all formed integrally with the relevant second electrode part 31 by using the translucent conductive material constituting the second electrode part 31.

FIG. 5B illustrates a cross-sectional view (taken along line VB-VB) of the laminated structure at an intersection between the first electrode string 20 in row x3 and the second electrode string 30 in column yd in FIG. 4.

The second electrode part 31A is divided into two segmented electrode layers 33 by the wire path 32. A second insulating layer 43 is formed on the wire path 32 and second wiring layer 35d, and a second bridge connecting layer 44 is formed on the second insulating layer 43. The segmented electrode layers 33, into which the second electrode part 31A has been divided by the wire path 32, are mutually connected by the second bridge connecting layer 44. This enables the whole of the second electrode part 31A to function as a single electrode layer. This is also true for all second electrode parts 31A provided at other places.

The second insulating layer 43 illustrated in FIG. 5B is formed from the same material as the first insulating layer 41 illustrated in FIG. 5A in the process in which the first insulating layer 41 is formed. The second bridge connecting layer 44 illustrated in FIG. 5B is formed from the same material as the first bridge connecting layer 42 illustrated in FIG. 5A in the process in which the first bridge connecting layer 42 is formed.

In the manufacturing process of the input device 10, a raw material including a layer formed from a translucent conductive material such as an ITO material is used on the surface of the base material 11. A preferable translucent conductive material is a crystallized ITO material. By etching this conductive material, the first electrode string 20, second electrode string 30, first wiring layers 25a, 25b and 25c, and second wiring layers 35a, 35b, 35c and 35d are formed. Part of the first wire part 141 and second wire part 142 is also formed.

After that, a resin layer including a novolak resin and acrylic resin is formed on the base material 11, and the first insulating layer 41 and second insulating layer 43 are concurrently patterned in a photolithography process. In addition, a laminated body for use as a bridge connecting layer is formed, and the first bridge connecting layer 42 and second bridge connecting layer 44 are concurrently formed by an etching process. The laminated body for use as a bridge connecting layer is formed in the circumferential region OR as well. The flexible laminated body 15 is formed so as to connect the connecting part 141a of the first wire part 141 and the connecting part 142a of the second wire part 142 in the process in which the first bridge connecting layer 42 and second bridge connecting layer 44 are formed by etching.

With the input device 10, an image displayed on the display panel 7 is visible from the outside through the base material 11 and panel section 3b. The input device 10 can be manipulated by touching the panel section 3b with a finger while viewing the image.

With this input device 10, capacitances are formed between the first electrode strings 20 and the second electrode strings 30. Pulse-shaped driving electric power is sequentially given to any one type of electrode strings, first electrode strings 20 or second electrode strings 30. When the driving electric power is given to an electrode string, a sensing current flowing in the other electrode string is detected. When a finger comes close to the panel section 3b, a capacitance is formed between the finger and an electrode layer. Thus, the detected current changes. When this change in the detected current is sensed, it is possible to detect the place, on the panel section 3b, to which the finger is coming close.

Since the wire path 32 passing in the Y direction is formed in the second electrode part 31A, its area is essentially smaller than the area of an electrode not having the wire path 32, so sensitivity may vary for each electrode layer in a sensing operation. In view of this, an opening 31b is formed in the second electrode part 31, in which the wire path 32 is not formed, so that a difference in the area does not become so large between the second electrode part 31A having the wire path 32 and the second electrode part 31 not having the wire path 32.

In addition, an opening 21b is formed in the first electrode part 21 as well so that a difference in the area does not become so large between the first electrode part 21 and the second electrode part 31A.

In the input device 10, the second wiring layers 35b, 35c, and 35d pass through the interior of the wire path 32 formed in the second electrode part 31A and extend in the Y direction. Since the second wiring layers 35b, 35c, and 35d are interposed between the segmented electrode layers 33 of the second electrode part 31A at both ends in the X direction, regions adjacent to the second wiring layers 35b, 35c and 35d and the relevant first electrode part 21 can be reduced. Thus, static coupling between the first electrode part 21 and each of the second wiring layers 35b, 35c and 35d can be lowered. Accordingly, it can be suppressed that the routed parts of the second wiring layers 35b, 35c, and 35d have extra sensitivity, so noise is less likely to be superimposed on outputs actually sensed between the first electrode string 20 and the second electrode string 30. Therefore, it becomes possible to increase sensing precision.

Since the second wiring layers 35b, 35c, and 35d pass through the interior of the second electrode part 31A, there is no need to form, between adjacent electrode layers, a path through which the second wiring layer passes. Therefore, placement of the first electrode parts 21 and second electrode parts 31 is not restricted by the routing of the second wiring layers. For example, the first electrode part 21 and second electrode part 31 can be placed so as to be brought close to each other, so it becomes possible to increase resolution in sensing operation.

EXAMPLES

Next, results in bending test performed for wires formed in the bent portion BR of the base material 11 will be described.

Tested wiring patterns are as follows. The following wiring patterns were formed on the base material 11 that was used in common. The base material 11 was a PET film 50 μm thick.

(1) Wiring pattern P1: crystallized ITO layer (40 μm wide)
(2) Wiring pattern P2: crystallized ITO layer (100 μm wide)
(3) Wiring pattern P3: crystallized ITO layer+metal layer (30 μm wide)
(4) Wiring pattern P4: crystallized ITO layer+metal layer (40 μm wide)
(5) Wiring pattern P5: crystallized ITO layer+metal layer (100 μm wide)
(6) Wiring pattern P6: flexible laminated body 15 (15 μm wide)
(7) Wiring pattern P7: flexible laminated body 15 (40 μm wide)
(8) Wiring pattern P8: flexible laminated body 15 (100 μm wide)

As for the above wiring patterns, the thickness of the crystallized ITO layers was 25 nm. The metal layers were each a laminated body including a CuNi layer (40 nm thickness), a Cu layer (120 nm thickness), and a CuNi layer (10 nm thickness) placed in that order, CuNi (40 nm thickness) being closest to the crystallized ITO layer. The flexible laminated body 15 was a laminated body including an amorphous ITO layer (12 nm thickness), an Au layer (13 nm thickness), and an amorphous ITO layer (35 nm thickness) placed in that order, the amorphous ITO layer (12 nm thickness) being closest to the base material 11.

In this embodiment, three samples were formed on the common base material 11, each sample including the above wiring patterns P1 to P8. The three samples were a first sample, a second sample, and a third sample. Only for the third sample, insulating films were formed as the bases of the wiring patterns P6 to P8. That is, for the first and second samples, the wiring patterns P1 to P8 were in contact with the base material 11, and for the third sample, the wiring patterns P1 to P5 were in contact with the base material 11 and an insulating film was interposed between the base material 11 and each of the wiring pattern P6 to P8.

For the above first, second, and third samples, mandrel test was performed according to JIS K5600-5-1: 1999.

In mandrel test, bending test was performed by using mandrels with diameters of 32, 25, 20, 19, 16, 13, 12, 10, 8, 6, 5, 4, 3, and 2 mm Rates of change in resistance (percentage calculated from [{(resistance after bending test/resistance before bending test)−1}×100]) were investigated. In this embodiment, a result in which the rate of change in resistance was 10% or less, the case was decided to be good and a result in which the rate exceeded 10%, the case was decided to be bad.

Results in mandrel test for the first sample will be indicated in Table 1, results in mandrel test for the second sample will be indicated in Table 2, and results in mandrel test for the third sample will be indicated in Table 3. In Tables 1, 2, and 3, ◯ indicates "good" and x indicates "bad".

TABLE 1

| | Mandrel diameter (mm) | | | | | | | | | | | | | |
|---|---|---|---|---|---|---|---|---|---|---|---|---|---|---|
| Rate of change in resistance | 32 | 25 | 20 | 19 | 16 | 13 | 12 | 10 | 8 | 6 | 5 | 4 | 3 | 2 |
| (P1) Crystallized ITO layer, 40 μm | ◯ | ◯ | ◯ | ◯ | ◯ | ◯ | ◯ | ◯ | ◯ | ◯ | ◯ | x | x | x |
| (P2) Crystallized ITO layer, 100 μm | ◯ | ◯ | ◯ | ◯ | ◯ | ◯ | ◯ | ◯ | ◯ | ◯ | ◯ | x | x | x |
| (P3) Crystallized ITO layer + metal layer, 30 μm | ◯ | ◯ | ◯ | ◯ | ◯ | ◯ | ◯ | ◯ | ◯ | ◯ | ◯ | ◯ | ◯ | ◯ |
| (P4) Crystallized ITO layer + metal layer, 40 μm | ◯ | ◯ | ◯ | ◯ | ◯ | ◯ | ◯ | ◯ | ◯ | ◯ | ◯ | ◯ | ◯ | ◯ |

TABLE 1-continued

| Rate of change in resistance | Mandrel diameter (mm) | | | | | | | | | | | | | |
|---|---|---|---|---|---|---|---|---|---|---|---|---|---|---|
| | 32 | 25 | 20 | 19 | 16 | 13 | 12 | 10 | 8 | 6 | 5 | 4 | 3 | 2 |
| (P5) Crystallized ITO layer + metal layer, 100 μm | ○ | ○ | ○ | ○ | ○ | ○ | ○ | ○ | ○ | ○ | ○ | ○ | ○ | ○ |
| (P6) Flexible laminated body, 15 μm | ○ | ○ | ○ | ○ | ○ | ○ | ○ | ○ | ○ | ○ | ○ | ○ | ○ | ○ |
| (P7) Flexible laminated body, 40 μm | ○ | ○ | ○ | ○ | ○ | ○ | ○ | ○ | ○ | ○ | ○ | ○ | ○ | ○ |
| (P8) Flexible laminated body, 100 μm | ○ | ○ | ○ | ○ | ○ | ○ | ○ | ○ | ○ | ○ | ○ | ○ | ○ | ○ |

TABLE 2

| Rate of change in resistance | Mandrel diameter (mm) | | | | | | | | | | | | | |
|---|---|---|---|---|---|---|---|---|---|---|---|---|---|---|
| | 32 | 25 | 20 | 19 | 16 | 13 | 12 | 10 | 8 | 6 | 5 | 4 | 3 | 2 |
| (P1) Crystallized ITO layer, 40 μm | ○ | ○ | ○ | ○ | ○ | ○ | ○ | ○ | ○ | ○ | ○ | x | x | x |
| (P2) Crystallized ITO layer, 100 μm | ○ | ○ | ○ | ○ | ○ | ○ | ○ | ○ | ○ | ○ | ○ | x | x | x |
| (P3) Crystallized ITO layer + metal layer, 30 μm | ○ | ○ | ○ | ○ | ○ | ○ | ○ | ○ | ○ | ○ | ○ | ○ | ○ | ○ |
| (P4) Crystallized ITO layer + metal layer, 40 μm | ○ | ○ | ○ | ○ | ○ | ○ | ○ | ○ | ○ | ○ | ○ | ○ | ○ | ○ |
| (P5) Crystallized ITO layer + metal layer, 100 μm | ○ | ○ | ○ | ○ | ○ | ○ | ○ | ○ | ○ | ○ | ○ | ○ | ○ | ○ |
| (P6) Flexible laminated body, 15 μm | ○ | ○ | ○ | ○ | ○ | ○ | ○ | ○ | ○ | ○ | ○ | ○ | ○ | ○ |
| (P7) Flexible laminated body, 40 μm | ○ | ○ | ○ | ○ | ○ | ○ | ○ | ○ | ○ | ○ | ○ | ○ | ○ | ○ |
| (P8) Flexible laminated body, 100 μm | ○ | ○ | ○ | ○ | ○ | ○ | ○ | ○ | ○ | ○ | ○ | ○ | ○ | ○ |

TABLE 3

| Rate of change in resistance | Mandrel diameter (mm) | | | | | | | | | | | | | |
|---|---|---|---|---|---|---|---|---|---|---|---|---|---|---|
| | 32 | 25 | 20 | 19 | 16 | 13 | 12 | 10 | 8 | 6 | 5 | 4 | 3 | 2 |
| (P1) Crystallized ITO layer, 40 μm | ○ | ○ | ○ | ○ | ○ | ○ | ○ | ○ | ○ | ○ | ○ | x | x | x |
| (P2) Crystallized ITO layer, 100 μm | ○ | ○ | ○ | ○ | ○ | ○ | ○ | ○ | ○ | ○ | ○ | x | x | x |
| (P3) Crystallized ITO layer + metal layer, 30 μm | ○ | ○ | ○ | ○ | ○ | ○ | ○ | ○ | ○ | ○ | ○ | ○ | ○ | ○ |
| (P4) Crystallized ITO layer + metal layer, 40 μm | ○ | ○ | ○ | ○ | ○ | ○ | ○ | ○ | ○ | ○ | ○ | ○ | ○ | ○ |
| (P5) Crystallized ITO layer + metal layer, 100 μm | ○ | ○ | ○ | ○ | ○ | ○ | ○ | ○ | ○ | ○ | ○ | ○ | ○ | ○ |
| (P6) Flexible laminated body, 15 μm | ○ | ○ | ○ | ○ | ○ | ○ | ○ | ○ | ○ | ○ | ○ | ○ | ○ | ○ |
| (P7) Flexible laminated body, 40 μm | ○ | ○ | ○ | ○ | ○ | ○ | ○ | ○ | ○ | ○ | ○ | ○ | ○ | ○ |
| (P8) Flexible laminated body, 100 μm | ○ | ○ | ○ | ○ | ○ | ○ | ○ | ○ | ○ | ○ | ○ | ○ | ○ | ○ |

In the above mandrel test, as for the wiring patterns P3 to P8, all of the first to third samples resulted in "good" for the mandrels with all diameters from 32 mm to 2 mm. By contrast, as for the wiring pattern P1, all of the first to third samples resulted in "bad" when the diameter was 4 mm or less. As for the wiring pattern P2 as well, all of the first to third samples resulted in "bad" when the diameter was 4 mm or less.

Repeated bending test was performed for the above first, second, and third samples.

In repeated bending test, the samples were repeatedly subjected to a cycle in which the samples were bent through about 180 degrees along a stage end having a curved surface with a diameter of about 10 mm and then stretched. Relationships between the number of repetitions and rates of change in resistance (percentage calculated from [{(resistance after repeated bending test performed a predetermined number of times/resistance before repeated bending test)−1}×100]) were investigated. In this embodiment, a case in which the rate of change in resistance is 10% or less was decided to be good, and a case in which the rate exceeded 10% was decided to be bad.

Results in repeated bending test for the first sample will be indicated in Table 4, results in repeated bending test for the second sample will be indicated in Table 5, and results in repeated bending test for the third sample will be indicated in Table 6. In Tables 4, 5, and 6, ○ indicates "good" and x indicates "bad". A blank cell indicates that there is no measured data.

TABLE 4

| | Number of bends | | | | | | |
|---|---|---|---|---|---|---|---|
| Rate of change in resistance | 0 | 10 | 100 | 1000 | 10000 | 20000 | 30000 |
| (P1) Crystallized ITO layer, 40 μm | ○ | x | x | x | | x | |
| (P2) Crystallized ITO layer, 100 μm | ○ | ○ | x | x | x | x | |
| (P3) Crystallized ITO layer + metal layer, 30 μm | ○ | ○ | ○ | x | x | x | |
| (P4) Crystallized ITO layer + metal layer, 40 μm | ○ | ○ | ○ | x | x | x | x |
| (P5) Crystallized ITO layer + metal layer, 100 μm | ○ | ○ | ○ | ○ | x | x | x |
| (P6) Flexible laminated body, 15 μm | ○ | ○ | ○ | ○ | ○ | ○ | ○ |
| (P7) Flexible laminated body, 40 μm | ○ | ○ | ○ | ○ | ○ | ○ | ○ |
| (P8) Flexible laminated body, 100 μm | ○ | ○ | ○ | ○ | ○ | ○ | ○ |

TABLE 5

| | Number of bends | | | | | | |
|---|---|---|---|---|---|---|---|
| Rate of change in resistance | 0 | 10 | 100 | 1000 | 10000 | 20000 | 30000 |
| (P1) Crystallized ITO layer, 40 μm | ○ | ○ | ○ | x | x | x | |
| (P2) Crystallized ITO layer, 100 μm | ○ | ○ | ○ | x | x | x | x |
| (P3) Crystallized ITO layer + metal layer, 30 μm | ○ | ○ | x | x | x | x | |
| (P4) Crystallized ITO layer + metal layer, 40 μm | ○ | ○ | ○ | x | x | x | |
| (P5) Crystallized ITO layer + metal layer, 100 μm | ○ | ○ | ○ | ○ | x | x | x |
| (P6) Flexible laminated body, 15 μm | ○ | ○ | ○ | ○ | ○ | ○ | ○ |
| (P7) Flexible laminated body, 40 μm | ○ | ○ | ○ | ○ | ○ | ○ | ○ |
| (P8) Flexible laminated body, 100 μm | ○ | ○ | ○ | ○ | ○ | ○ | ○ |

TABLE 6

| | Number of bends | | | | | | |
|---|---|---|---|---|---|---|---|
| Rate of change in resistance | 0 | 10 | 100 | 1000 | 10000 | 20000 | 30000 |
| (P1) Crystallized ITO layer, 40 μm | ○ | x | x | x | | x | |
| (P2) Crystallized ITO layer, 100 μm | ○ | ○ | x | x | x | x | |
| (P3) Crystallized ITO layer + metal layer, 30 μm | ○ | ○ | ○ | x | x | x | |
| (P4) Crystallized ITO layer + metal layer, 40 μm | ○ | ○ | ○ | x | x | x | |
| (P5) Crystallized ITO layer + metal layer, 100 μm | ○ | ○ | ○ | ○ | x | x | |
| (P6) Flexible laminated body, 15 μm | ○ | ○ | ○ | ○ | | x | |
| (P7) Flexible laminated body, 40 μm | ○ | ○ | ○ | ○ | | ○ | |
| (P8) Flexible laminated body, 100 μm | ○ | ○ | ○ | ○ | x | ○ | x |

In the above repeated bending test for the first and second samples (cases in which there was a contact between the base material 11 and each of the wiring patterns P1 to P8) indicated in Tables 4 and 5, as for the wiring patterns P6 to P8, the first and second samples resulted in good decisions even after 30,000 bends, that is, the rate of change in resistance did not exceed 10%. By contrast, as for the wiring pattern P1, the first sample resulted in "bad" before the pattern was bent 10 times, and the second sample resulted in "bad" before the pattern was bent 1000 times. As for the wiring pattern P2, the first sample resulted in "bad" before the pattern was bent 100 times, and the second sample resulted in "bad" before the pattern was bent 1000 times.

As for the wiring pattern P3, the first sample resulted in "bad" before the pattern was bent 1000 times, and the second sample resulted in "bad" before the pattern was bent 100 times. As for the wiring pattern P4, the first sample resulted in "bad" before the pattern was bent 1000 times, and the second sample resulted in "bad" before the pattern was bent 10,000 times. As for the wiring pattern P5, the first and second samples resulted in "bad" before the pattern was bent 10,000 bends.

For the third sample (cases in which an insulating layer is interposed between the base material 11 and each of the wiring patterns P6 to P8) indicated in Table 6, the wiring patterns P6 to P8 resulted in "good" even after 1000 bends. The wiring patterns P7 and P8 resulted in "good" even after 20,000 bends. By contrast, the wiring pattern P1 resulted in "bad" before the pattern was bent 10 times, the wiring pattern P2 resulted in "bad" before the pattern was bent 100 times, the wiring patterns P3 and P4 resulted in "bad" before the pattern was bent 1000 times, and the wiring pattern P5 resulted in "bad" before the pattern was bent 10,000 times.

As described above, in any case of the first, second, and third samples, when the flexible laminated body 15 such as the wiring patterns P6 to P8 is provided at the bent portion BR of the base material 11, even if the base material 11 is bent to a radius of curvature of about 2 mm or is repeatedly bent, it becomes possible to maintain superior conductivity. From the measurement results of the first and second samples and those of the third sample, it is found that since the base material 11 and flexible laminated body 15 are in contact with each other, resistance to bending is more increased.

As described above, according to the embodiment, it is possible to provide an input device that enables wires to be bent together with a base material without deteriorating translucency and conductivity of the wires.

So far, an embodiment and examples of the present invention have been described. However, the present invention is not limited to the embodiment and examples. For example, the scope of the present invention also includes embodiments and examples obtained as a result of adding or deleting constituent element to or from the above embodiment or examples, performing design changes to the above embodiment or examples, or combining features of exemplary structures in the embodiment or examples, as long as the intended scope of the invention is included; the additions, deletions, design changes, or combination is appropriately effected by a person having ordinary skill in the art.

What is claimed is:

1. An input device comprising:
    a base made of material having translucency and flexibility, the base having a sensing region, a peripheral region outside the sensing region, and a bent portion provided in the peripheral region;
    a plurality of first electrodes made of a translucent material, the plurality of first electrodes being arranged in the sensing region of the base in a first direction;
    a plurality of second electrodes made of the translucent material, the plurality of second electrodes being arranged in the sensing region of the base in a second direction crossing the first direction;
    a linking part made of the translucent material and integrally formed with the plurality of first electrodes or the plurality of second electrodes, the linking part connecting two adjacent electrodes of the plurality of first electrodes or the plurality of second electrodes with which the linking part is integrally formed;
    a first bridge connecting part formed over the linking part with a first insulating layer interposed therebetween, the first bridge connecting part electrically connecting two adjacent electrodes of the plurality of first electrodes or the plurality of second electrodes which are not connected by the linking part; and
    a plurality of lead wires that are electrically connected to the plurality of first electrodes and the plurality of second electrodes, the plurality of lead wires extending from within the sensing region to the peripheral region on the base, each of the plurality of lead wires including a flexible laminated body provided on the bent portion, the flexible laminated body includes:
        a first amorphous ITO layer provided on the base;
        a conductive layer provided on the first amorphous ITO layer; and
        a second amorphous ITO layer provided on the conductive layer
    wherein the plurality of second electrodes include at least one divided electrode divided into electrode parts so as to provide a wire path therebetween extending in the first direction, such that at least one of the plurality of lead wires extends through the wire path and electrically connects to another of the plurality of second electrodes,
    and wherein the input device further comprises:
        a second bridge connecting part formed across the wire path and the lead wire therein so as to electrically connect the corresponding electrode parts; and
        a second insulating layer interposed between the second bridge connecting part and the lead wire.

2. The input device according to claim 1,
    wherein each of the plurality of lead wires includes:
        a first wire part provided on a sensing region side of the bent portion; and
        a second wire part provided on an opposite side of the sensing region with respect to the bent portion,
    and wherein the flexible laminated body is positioned between the first wire part and the second wire part.

3. The input device according to claim 2, wherein the first wire part and second wire part have a respective connecting part connected to an end of the flexible laminated body, the connecting part having a surface facing the flexible laminated body, the surface including a crystallized ITO surface.

4. The input device according to claim 3, wherein the first wire part includes a crystallized ITO layer.

5. The input device according to claim 4, wherein the second wire part includes a crystallized ITO layer.

6. The input device according to claim 2, wherein the first wire part includes a crystallized ITO layer.

7. The input device according to claim 6, wherein the second wire part includes a crystallized ITO layer.

8. The input device according to claim 2, wherein the wire path is formed in a center of the second electrode such that the second electrode is divided into halves in the second direction.

9. The input device according to claim 1, wherein the first amorphous ITO layer is in contact with the base.

10. The input device according to claim 1, wherein the conductive layer includes a noble metal.

11. The input device according to claim 1, wherein a radius of curvature of the bent portion is 5 millimeters or less.

12. The input device according to claim 1, wherein the first bridge connecting part and the second bridge connecting part are formed of the same material as the flexible laminated body.

13. The input device according to claim 1, wherein each of the plurality of second electrodes which are not divided is provided with an opening formed therein.

14. The input device according to claim 1, wherein each of the plurality of first electrodes is provided with an opening formed therein.

15. The input device according to claim 1, wherein the first insulating layer and the second insulating layer are made of a same material and formed in a same process step, and wherein the first bridge connecting part and the second bridge connecting part are made of a same material and formed in a same process step.

16. The input device according to claim 1, wherein the plurality of first electrodes and the plurality of second electrodes are in a substantially square shape having corners oriented in the first direction and the second direction.

17. An input device comprising:
a base made of material having translucency;
a plurality of first electrodes made of a translucent material, the plurality of first electrodes being arranged on the base in a first direction;
a plurality of second electrodes made of the translucent material, the plurality of second electrodes being arranged on the base in a second direction crossing the first direction;
a linking part made of the translucent material and integrally formed with the plurality of first electrodes or the plurality of second electrodes, the linking part connecting two adjacent electrodes of the plurality of first electrodes or the plurality of second electrodes with which the linking part is integrally formed;
a first bridge connecting part formed over the linking part with a first insulating layer interposed therebetween, the first bridge connecting part electrically connecting two adjacent electrodes of the plurality of first electrodes or the plurality of second electrodes which are not connected by the linking part; and
a wiring extending in the first direction,
wherein the plurality of second electrodes include at least one divided electrode divided into electrode parts so as to provide a wire path therebetween extending in the first direction, such that the wiring extending through the wire path and electrically connects to another of the plurality of second electrodes,
and wherein the input device further comprises:
a second bridge connecting part formed over the wire path and the wiring therein so as to electrically connect the corresponding divided electrodes; and
a second insulating layer interposed between the second bridge connecting part and the lead wire extending through the wire path.

18. The input device according to claim 17, wherein each of the plurality of second electrodes which are not divided by the wire path is provided with an opening formed therein.

19. The input device according to claim 17, wherein each of the plurality of first electrodes is provided with an opening formed therein.

20. The input device according to claim 17, wherein the wire path is formed in a center of the second electrode such that the second electrode is divided into halves in the second direction.

21. The input device according to claim 17, wherein the first insulating layer and the second insulating layer are made of a same material and formed in a same process step, and wherein the first bridge connecting part and the second bridge connecting part are made of a same material and formed in a same process step.

22. The input device according to claim 17, wherein the plurality of first electrodes and the plurality of second electrodes are in a substantially square shape having corners oriented in the first direction and the second direction.

* * * * *